Feb. 23, 1943. A. MURDOCH ET AL 2,312,262
ANTENNA REEL
Filed March 31, 1939 3 Sheets-Sheet 1
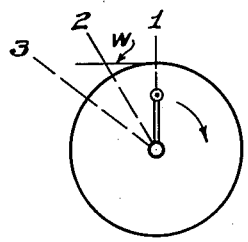
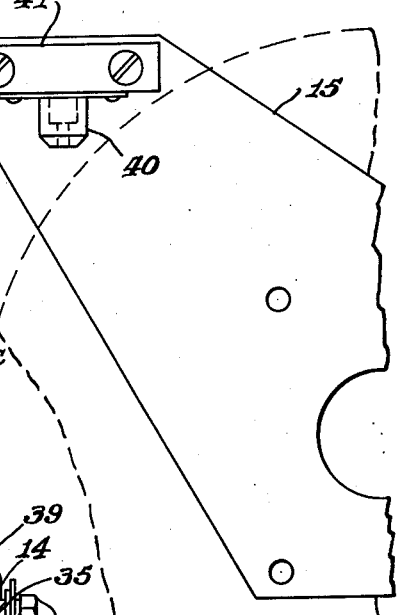
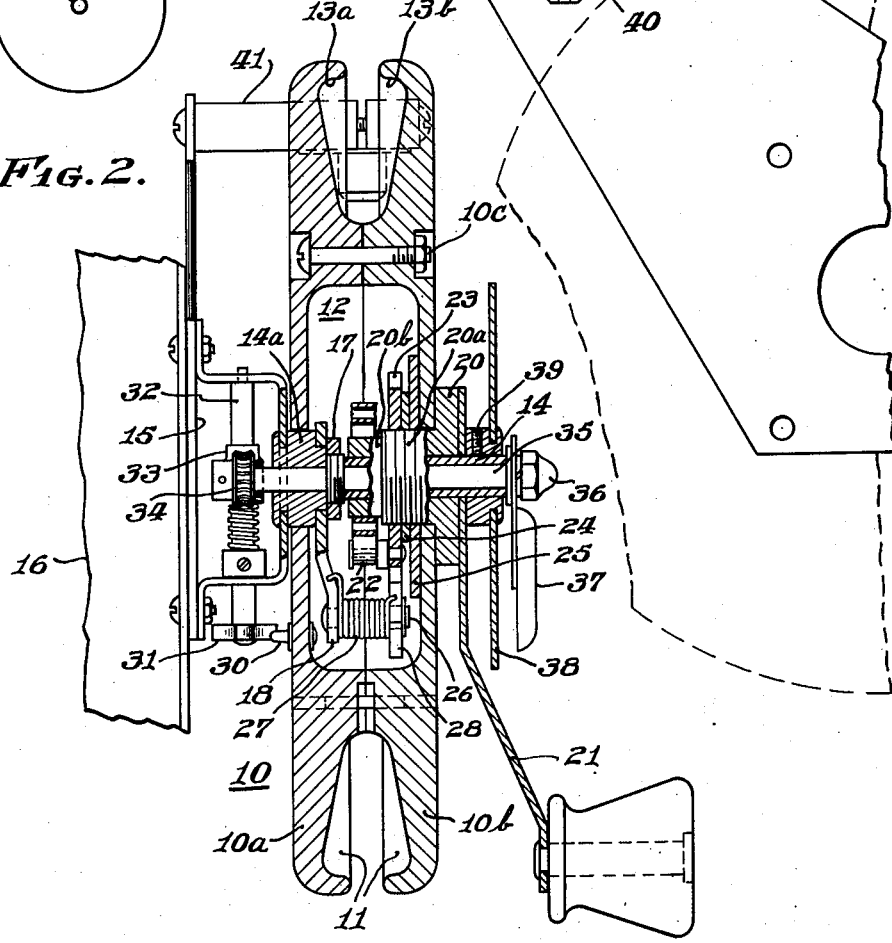
Inventors
Alexander Murdoch
William D. Van Dyke
By
Attorney

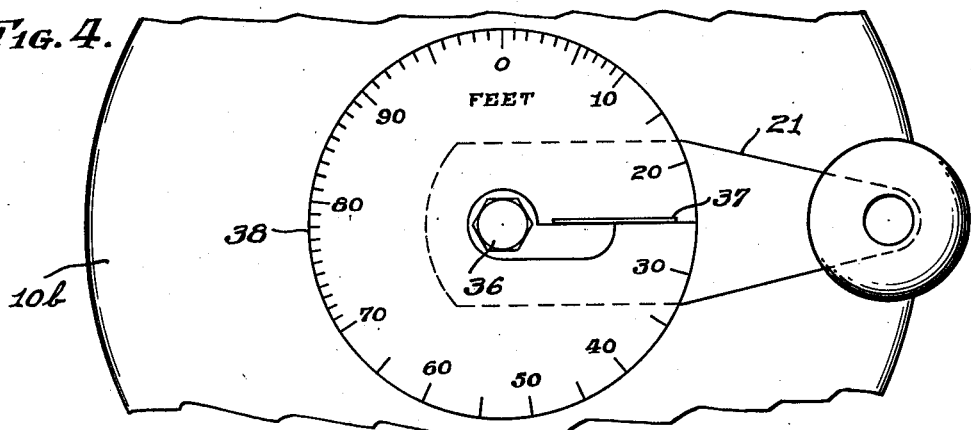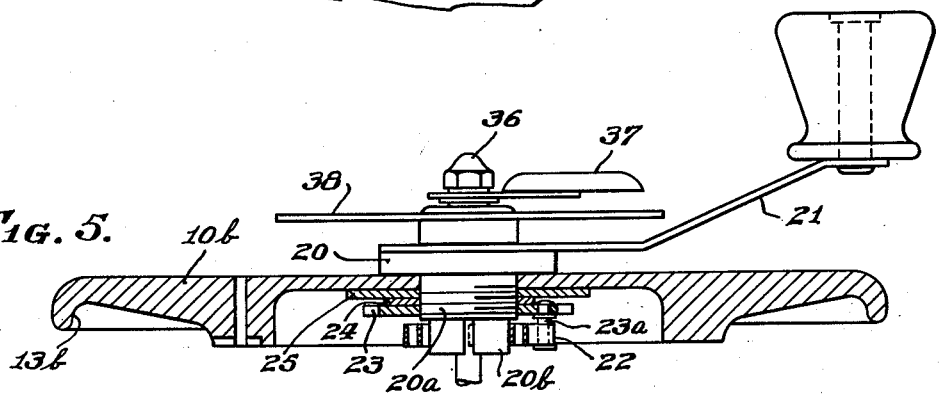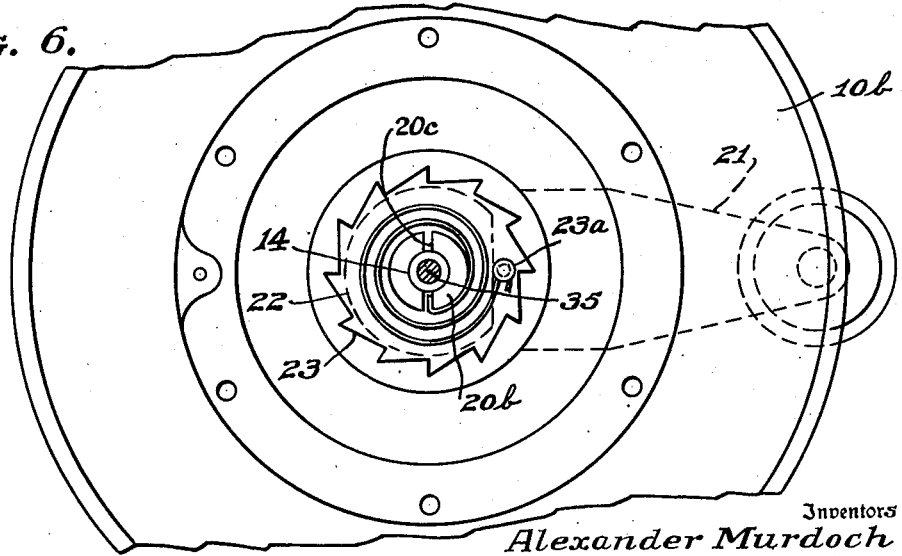

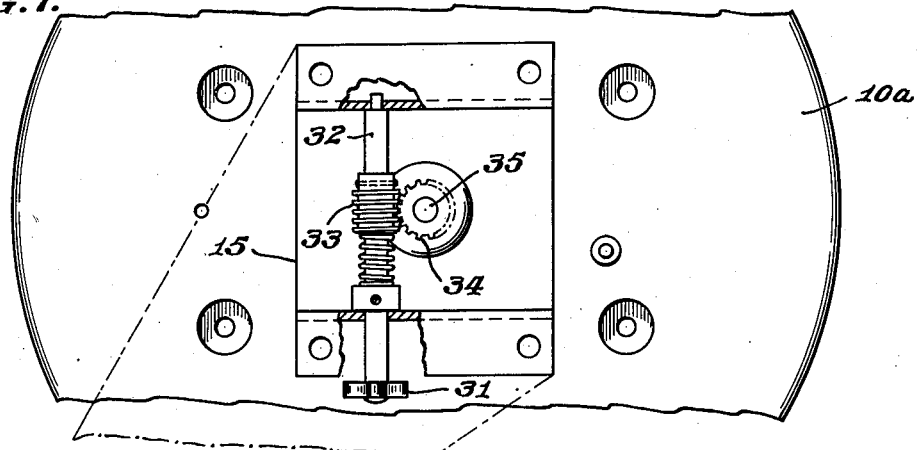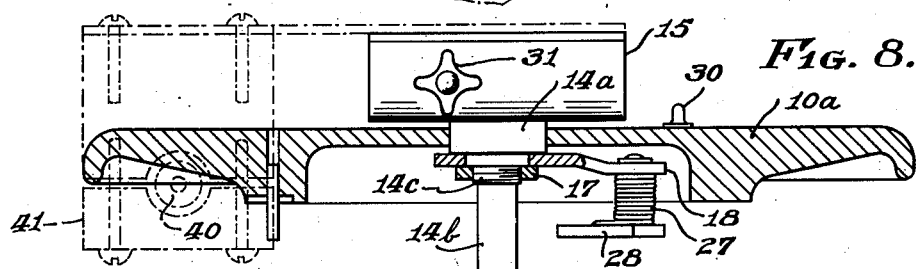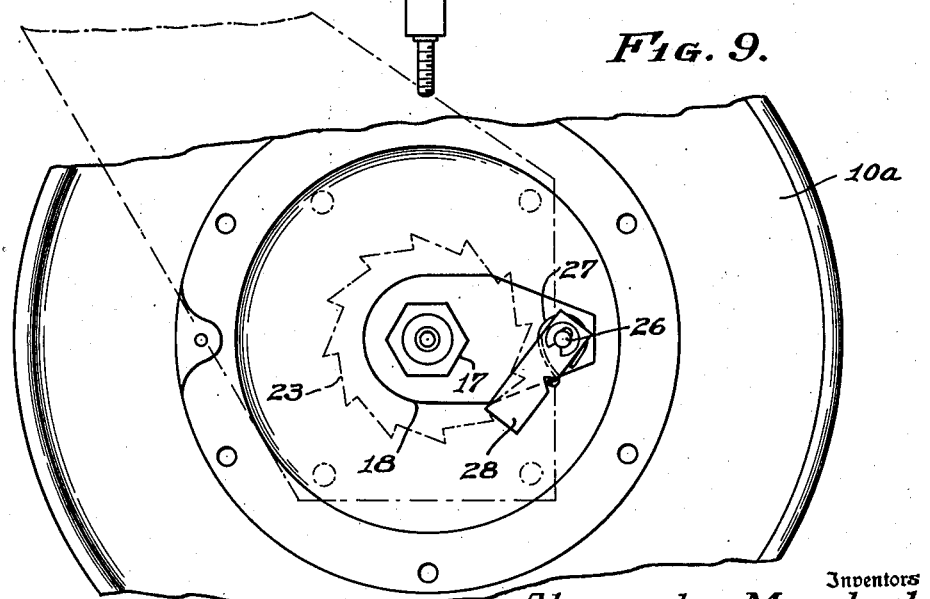

Patented Feb. 23, 1943

2,312,262

UNITED STATES PATENT OFFICE 2,312,262

ANTENNA REEL

Alexander Murdoch, Philadelphia, Pa., and William D. Van Dyke, Riverton, N. J., assignors to Radio Corporation of America, a corporation of Delaware Application March 31, 1939, Serial No. 265,268

3 Claims. (Cl. 242—99)

This invention relates to reels and particularly to antenna reels for use on aircraft.

Antenna reels of the prior art are usually provided, in addition to the crank with one or more auxiliary buttons or levers for controlling the various braking, clutching and locking elements comprising the reel mechanism. Such auxiliary controls augment the possibility of trouble, and render what should be effected by simple rotary movement, a more or less complex operation.

Accordingly, the principal object of the invention is to provide a reel capable of being reeled, unreeled, braked, stopped and "locked" by simple rotary movement of the handle thereof.

A related object of the invention is to provide a reliable, trouble-free antenna reel and one characterized by the absence of auxiliary clutching and braking control-buttons and levers.

In the drawings:

Figure 1 is a schematic plan view of a reel which will be referred to in describing the objects and the principle of operation of the invention;

Figure 2 is a sectional view of an antenna reel constructed in accordance with the principle of the invention;

Figure 3 is a fragmentary detailed view of the reel supporting bracket and antenna fairleader;

Figure 4 is a fragmentary front plan view showing the reel handle and reel-meter;

Figure 5 is a transverse sectional view of the right-hand half of the reel as viewed in Fig. 2;

Figure 6 is a fragmentary view of the inner face of the right-hand half of the reel as viewed in Fig. 2;

Figure 7 is a fragmentary rear plan view of the reel showing a part of the meter mechanism;

Figure 8 is a bottom edge view in section of so much of the reel as is shown in Fig. 7; and Figure 9 is a fragmentary plan view of the inner rear face of the reel.

The foregoing objects of the invention may be visualized by reference to Fig. 1, wherein the reel will be understood to have a mechanism so arranged (in the manner later described) that when the handle is turned in a clockwise direction, as indicated by the curved arrow, the line or antenna wire W is reeled in. When the wire is completely or partly wound in, as desired, the operator merely releases his hold upon the handle and the winding mechanism is held in that position, as indicated at 1. In order to permit the antenna wire to unwind freely, the handle is moved through an arc of, say, 45° in the counter-clockwise direction, as indicated at 3. When approaching the point at which a desired length of wire has been payed out, a braking action is applied by gradually returning the handle, in the clockwise direction, towards its original position, as indicated at 2. Further movement of the handle in the clockwise direction, toward 1, "locks" the reel until it is again released by movement in the counter-clockwise direction.

Referring now to Figs. 2 to 9, inclusive, wherein like reference characters designate the same or corresponding parts in all figures. In these drawings 10a and 10b designate, respectively, two complementary, symmetrically formed, insulating discs which, when joined as by bolts 10c, form a frame or spool 10 which is provided on its peripheral edge with a groove 11 within which the antenna wire W (Fig. 1) is wound, and a central chamber 12, which serves as a housing for at least a part of the operating mechanism. Because the last of the unwound turns are the more important in determining the length of wire released during a definite unreeling interval (and are consequently the most important in determining the accuracy of the meter indicia) they are more accurately located when the groove 11 is triangular in cross section with the apex directed inwardly, as shown in Fig. 2. The peripheral edges of the groove 11 are preferably turned inwardly, as shown at 13a, 13b, to prevent the operator from accidentally touching the antenna and receiving a shock therefrom when the transmitter is in operation.

The reel form or spool 10 rotates about a hollow hub 14 which is immovably supported upon a bracket 15 which may be fixed to a panel 16 in a position convenient to the operator. As shown at 14a, the hub 14 is preferably of enlarged diameter adjacent its point of attachment to the bracket and of uniformly smaller diameter, 14b, throughout the rest of its length. That portion of the hub which lies adjacent its enlarged end 14a is preferably threaded on its outer surface, as indicated at 14c, to receive a nut 17 which serves to clamp a dependent arm 18 thereon.

A sleeve 20 which extends through the spool section 10b into the central chamber 12 is revolvably mounted upon the hub 14 and has a handle 21 attached thereto. This sleeve 20 has a bearing fit within the central orifice in spool section 10b and, like the enlarged section 14a of the hub 14, comprises a bearing upon which the spool rotates when an unreeling movement is imparted thereto. That portion of the sleeve which extends into the chamber 12 is threaded on its outer surface throughout a portion of its length, as indicated at 20a. Here the spool 20 is designed to be reeled when turned in a clockwise direction, hence threads 20a are right-handed. Alternatively, if reeling is to be accomplished by counter-clockwise movement of the spool, threads 20a may be left-handed threads. The sleeve 20 terminates in a non-threaded section 20b which is preferably of a diameter less than that of the threaded portion 20a.

As shown more clearly in Figs. 2, 5 and 6, the unthreaded smaller section 20b of the sleeve has a spring 22 wound thereon, and the threaded section 20a has a unitary assembly comprising a ratchet 23, a spacer 24 and a braking element 25 supported thereon. As shown more clearly in Fig. 6, the inner terminal of the spring 22 is anchored in a slot 20c which is provided for the purpose on sleeve section 20b and the other or outer terminal of this spring is secured as by means of a stud 23a to the ratchet 23. The spacer 24 permits the head of the the stud 23a to be accommodated between the opposed side faces of the ratchet 23 and braking element 25.

The common inner axial surface of the mechanically integral parts 23, 24 and 25 contains threads which are complementary to those on the threaded section 20a of the sleeve, so that these parts may be moved a limited distance therealong should some force sufficient to overcome the bias of spring 22 be applied to the said parts. In this connection, it should be noted that when (as in the illustrated embodiment of the invention) the threads 20a are right-handed threads, the spring 22 exerts its bias upon the ratchet 23 (and hence upon the spacer 24 and braking element 25) in a direction to screw it up on sleeve section 20a so that the braking element 25 is urged into frictional engagement with that surface of the chamber 12 which comprises the inner surface of the spool section 10b. Since spring 22 is anchored to the sleeve 20 and turns therewith, the force exerted by this spring upon the ratchet assembly is not cumulative but is of a constant value so long as the torque applied to the spool 10 through the handle 21 is in a clockwise direction.

Referring particularly to Figs. 2, 8 and 9, the dependent arm 18, which, as previously described, is secured to the immovable hub 14 by nut 17, is provided with a lateral extension 26 upon which a torsion spring 27 is wound. A pawl 28 is mounted adjacent the end of the lateral arm 26 in line with the teeth of the ratchet 23. The spring 27 exerts its bias upon the pawl 28 whereby the pawl is constrained to ride over the inclined teeth of the ratchet when it is turned in a clockwise direction by similar movement of the crank 21. Obviously, when the handle has stopped turning, the pawl will come to rest against the nearest radially extending surface of the ratchet teeth, as indicated in Fig. 9, and, since in this idle position the braking element 25 is urged against the spool surface, the spool 10 will be maintained in the idle position. If the crank 21 be now turned in the counter-clockwise direction, the ratchet 23 cannot be turned with respect to the pawl 28 (see Fig. 9) but the ratchet assembly (23, 24, 25) can be moved inwardly on the threaded portion 20a of the sleeve provided only that the torque applied to the hub is of sufficient intensity to overcome the bias of the spring 22 which normally maintains the braking element 25 of the ratchet assembly against the inner surface of the spool.

Only a small degree of counter-clockwise movement of the crank, say, 45°, is sufficient to urge the ratchet 23 and hence the braking surface 25 thereon inwardly on the threaded portion 20a of the sleeve, so that the braking surface is gradually brought out of contact with the inner surface of the spool. As long as the crank 21 is held in the position whereat the brake 25 is entirely disengaged, the antenna wire (not shown) can be freely unreeled at a rate determined primarily by the drag exerted thereon by the plumb bob or other appendage (not shown) on the free end thereof. When approaching the point at which a desired length of wire has been unreeled, the crank 21 is moved in the clockwise direction toward the point in which it was positioned when the unreeling operation commenced. This counter bias upon the spring 22 is thus relieved and, as the normal braking bias returns, the brake is gradually screwed up on the threaded portion 20a of the sleeve 20 until, at the will of the operator, it exerts its full braking force upon the inner surface of the spool. Unreeling is halted when the crank has been returned substantially to the position whereat the unreeling commenced.

It is, of course, desirable to make provision for indicating the length of the wire unreeled. To this end, the antenna wire, not shown, may be marked with different colored bands at spaced points throughout its length. Preferably, however, a direct reading meter is provided. One form of meter and pointer mechanism is shown in Figs. 2, 4, 5, 7 and 8.

The indicating mechanism shown in Figs. 2, 4, 5, 7 and 8 includes a pin 30 which projects rearwardly from a suitable point on the spool section 10a to engage a star wheel 31 fixed to the end of a vertical shaft 32 which is revolvably supported on bracket 15. The vertical shaft 32 is provided with a worm 33 which meshes with a gear 34, fixed on the end of a revolvable shaft 35, which extends through the hollow immovable hub 14. Fixed to the opposite end of the shaft 35, as by a nut 36, is a pointer 37 which rotates, with the shaft, about a suitably calibrated meter plate 38. The meter plate is fixed against rotation on the immovable hub 14 as by means of a screw 39.

As in standard practice, a fairleader 40, which may conveniently be mounted on a lateral extension 41 of the bracket 15, is preferably provided for guiding the antenna wire during reeling and unreeling.

It is to be understood that the foregoing description of a preferred embodiment of the invention is to be interpreted as illustrative and not in a limiting sense, except as required by the spirit of the appended claims.

What is claimed is:

1. A reel comprising a hollow spool having an axis of rotation, a rotatable member supported for rotation about said axis and upon which said hollow spool rotates, a brake element mounted within said hollow spool on said rotatable member for axial movement into and out of direct frictional engagement with an inner surface of said spool, said brake element comprising the sole coupling between said rotatable member and said spool, means for moving said brake element axially into and out of direct frictional engagement with said inner surface of said spool as determined by the direction of rotation of said rotatable member, and means for applying a reeling movement to said spool through said brake element when said brake element is in frictional engagement with said inner surface of said spool.

2. A reel comprising a hollow spool having an axis of rotation, a rotatable member supported for rotation about said axis and upon which said hollow spool rotates, a brake element mounted within said hollow spool on said rotatable member for axial movement into and out of direct frictional engagement with an inner surface of said spool, said brake element comprising the sole coupling between said rotatable member and said spool, a biasing spring mounted on said rotatable member within said hollow spool and arranged to move said braking element to an axial position whereat it is in direct frictional engagement with said inner surface of said spool, and means for applying a reeling movement to said spool through said rotatable member and braking element when said element is in frictional engagement with said inner surface of said hollow spool.

3. A reel comprising a hollow spool having an axis of rotation, a rotatable member supported for rotation about said axis and upon which said hollow spool rotates, a brake element mounted within said hollow spool on said rotatable member for axial movement into and out of direct frictional engagement with an inner surface of said spool, said brake element comprising the sole coupling between said rotatable member and said spool, a spring on said rotatable member within said spool and arranged to bias said braking element to that axial position whereat it is in direct braking engagement with said inner surface of said hollow spool, and means responsive to rotation of said rotatable member for moving said braking element against the biasing force of said spring to an axial position whereat it is out of braking engagement with said inner surface of said hollow spool, whereby said spool may be rotated in the unreeling direction.

ALEXANDER MURDOCH.
WILLIAM D. VAN DYKE.